(12) United States Patent
Walker et al.

(10) Patent No.: US 7,294,092 B2
(45) Date of Patent: Nov. 13, 2007

(54) CONTROL OF COASTING DOWNSHIFTS IN AN AUTOMATIC TRANSMISSION FOR MOTOR VEHICLES

(75) Inventors: Ralph Walker, Livonia, MI (US); Jesse Brunais, Livonia, MI (US); Karl Jungbluth, Commerce, MI (US); Todd Newman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 11/247,062

(22) Filed: Oct. 11, 2005

(65) Prior Publication Data
US 2007/0082784 A1 Apr. 12, 2007

(51) Int. Cl.
*B60W 10/04* (2006.01)
(52) U.S. Cl. ................................ 477/107; 477/169
(58) Field of Classification Search .................. 477/53, 477/54, 57, 58, 61, 107, 109, 169, 180, 118
See application file for complete search history.

(56) References Cited

U.S. PATENT DOCUMENTS

| | | | |
|---|---|---|---|
| 5,505,571 A * | 4/1996 | Jakob | 408/124 |
| 5,569,115 A * | 10/1996 | Desautels et al. | 477/110 |
| 6,066,071 A * | 5/2000 | Janecke et al. | 477/78 |
| 6,254,510 B1 | 7/2001 | Rauch et al. | |
| 6,269,293 B1 | 7/2001 | Correa et al. | |
| 6,485,393 B2 | 11/2002 | Schiele et al. | |
| 6,549,838 B2 | 4/2003 | O'Neil et al. | |
| 6,692,407 B2 * | 2/2004 | Shibata et al. | 477/110 |
| 6,740,005 B2 * | 5/2004 | Watanabe et al. | 477/110 |
| 6,908,413 B2 * | 6/2005 | Ayabe et al. | 477/109 |
| 6,931,315 B2 * | 8/2005 | Ayabe et al. | 701/59 |
| 2005/0049111 A1 * | 3/2005 | Takada et al. | 477/107 |
| 2006/0080018 A1 * | 4/2006 | Shimada et al. | 701/51 |
| 2006/0234830 A1 * | 10/2006 | Iriyama et al. | 477/109 |

* cited by examiner

*Primary Examiner*—Charles A. Marmor
*Assistant Examiner*—Justin K. Holmes
(74) *Attorney, Agent, or Firm*—David B. Kelly; MacMillan, Sobanski & Todd, LLC

(57) ABSTRACT

A method for controlling a coasting downshift in an automatic transmission having a torque converter that includes an impeller driveably connected to an engine and a turbine hydrokinetically coupled to the impeller and driveably connected to the transmission input. During a coast condition, the speed of the turbine decreases, and the speed of the engine decreases to and is maintained at an engine idle speed. After the downshift event begins, the turbine speed increases due a transfer of torque from an off-going transmission control element to an oncoming control element. Engine speed increases steadily until it reaches the target engine speed. The downshift is completed, and engine speed decreases until it again reaches the idle speed.

8 Claims, 4 Drawing Sheets

| COMMANDED ENGINE SPEED | | | | |
|---|---|---|---|---|
| 0 | 500 | | | |
| 600 | 650 | 680 | 700 | |
| 500 | 550 | 575 | 625 | |
| 0 | 0 | 0 | 0 | |
| 0 | 0 | 0 | 0 | |
| 0 | -300 | | | |

OUTPUT SHAFT DECELERATION   TURBINE SPEED-RPM

CONTROL OF COASTING DOWNSHIFTS IN AN AUTOMATIC TRANSMISSION FOR MOTOR VEHICLES

BACKGROUND OF THE INVENTION

The present invention relates generally to automatic transmissions for motor vehicles, and, more particularly, to the control and management of power-off or coasting downshifts in such transmissions.

It is difficult to calibrate excellent shift quality under all circumstances for coasting or power-off downshifts in synchronous automatic transmissions. Such calibrations are especially difficult under low-speed conditions where vehicle noise levels are low and gear ratio steps are largest. Coasting downshifts present the largest inhibitor to a fully synchronous automatic transmission design. Control strategies require calibration flexibility to ensure consistent, smooth downshifts under all operating conditions, but conventional gear shift control strategies are insufficient to meet the current requirements for coasting shift quality and cost.

In an automatic transmission a hydraulic pump, driveably connected to the engine shaft, produces fluid flow in a hydraulic system, which controls and actuates the ongoing and off-coming clutches, whose coordinated operation produce downshifts during coasting conditions. The speed of the pump, which has a constant displacement, can vary between about 500-7500 rpm; therefore the flow rate produced by the pump varies over a wide range. But at low speed during coast down gear shifting, the pump's operating efficiency is low and the flow rate it produces may be insufficient compared to that required to control the gear shifts. A conventional prior art solution is to control the engine during coast down shifts such that it operates at a higher speed than would otherwise be required but for the fluid flow rate requirement. Unfortunately this strategy reduces fuel economy.

Furthermore, if the speed of the torque converter turbine is greater than engine speed during coast down shifts, the resulting gear shifts are unacceptably harsh and readily noticed by vehicle occupants because engine speed is low.

SUMMARY OF THE INVENTION

In the active coast down management strategy according to this invention, closed loop engine speed control maintains engine speed at a magnitude that corresponds to the current target speed of the torque converter turbine during the shift. The target turbine speed changes as the shift progresses and as changes in vehicle deceleration occur. The control system enables target turbine speed offsets to be commanded as a function of target turbine speed and vehicle deceleration rate. This allows desired engine speed to be tuned to engine response and vehicle operating conditions.

The control commands unique coasting gear-shift points, which produce optimal performance. Without engine speed control, coasting downshifts are best executed below engine idle speed. But downshifts produced under the control of this invention occur at engine speed lower than idle speed without causing lash; therefore, they are best executed at speeds below engine idle speed. This flexibility allows both kinds of shifts to be calibrated in one strategy and the best choice for a given vehicle operating point can be used. Because actuating hydraulic pressure in the oncoming and off-going clutches and torque management during using the control of this invention are different from those in shifts controlled by other strategies, the control according to this invention provides unique pressure and torque management control when operating under the engine speed control mode compared to the magnitudes of those parameters when the downshifts are controlled without engine speed control.

A method according to this invention controls a downshift between gears of an automatic transmission connected to an engine through a torque converter that includes an impeller driveably connected to the engine and a turbine hydrokinetically coupled to the impeller and driveably connected to the transmission. During a coast condition before the downshift starts, the speed of the turbine decreases, and the speed of the engine decreases to a predetermined idle speed. After the downshift event begins, the turbine speed increases due to a transfer of torque from an off-going transmission control element to an oncoming control element. Engine speed increases steadily until it reaches the target engine speed. The downshift is completed, and engine speed decreases until it again reaches the idle speed.

The target engine speed may be the synchronous turbine speed for the target gear at the current vehicle speed, the synchronous turbine speed for the target gear at the current vehicle speed plus a constant speed. The target engine speed may vary as a function of a synchronous turbine speed for the target gear during the downshift, or as a function of a synchronous turbine speed for the target gear and a time rate of change of the speed of the output during the downshift.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
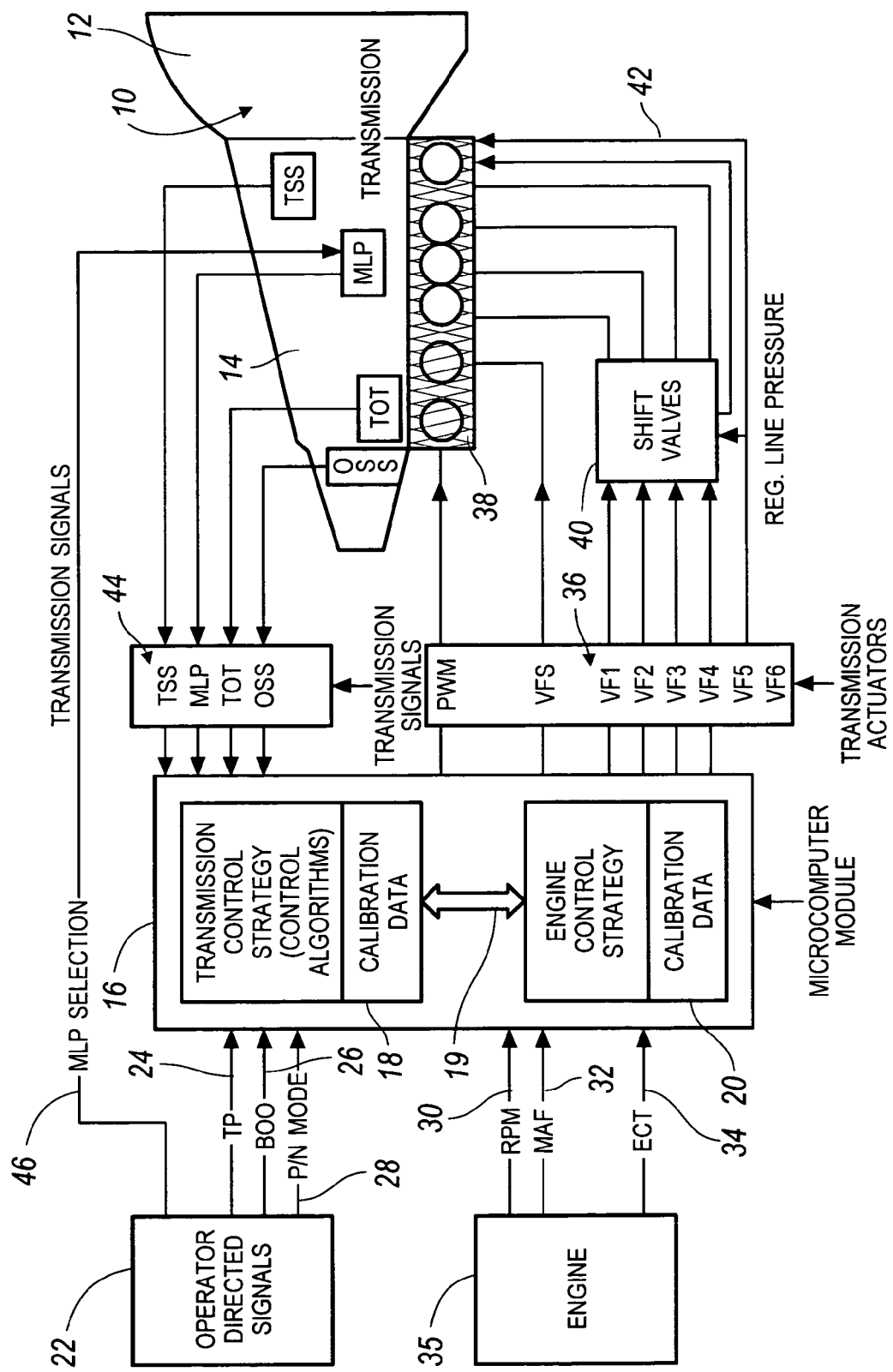
FIG. 1 is a schematic block diagram showing a multiple gear ratio automatic transmission, a transmission controller and an engine controller for a motor vehicle.

In FIG. 1, a powertrain system for a motor vehicle driveline includes a transmission 10 having a hydrokinetic torque converter enclosed in a converter housing 12, and gearing for producing multiple gear ratios enclosed in a housing 14.

A microcomputer 16 for use in controlling the system includes a transmission control strategy located in a transmission control unit TCU 18 and an engine control strategy in the engine control unit ECU 20. The control strategies, stored in electronic memory accessible to a central processor of the computer 16, include control method steps written in coded, lower level language, which can be interpreted and executed by the computer. Command signals, produced as output by the computer as directed by the control strategies, are supplied to various control elements and actuators, which respond to the commands by changing the operating state of the transmission and engine. For example, in response to signals representing commanded desired engine speed produced by the TCU 18 and sent to the ECU 20 on communication bus 19, the ECU executes a closed loop control resident in the ECU, and produces output signals to engine control devices to control engine speed to the commanded desired engine speed. Engine speed may be controlled by varying engine operating parameters including spark timing, fuel flow rate, air flow, throttle position, air-fuel ratio, etc.

Vehicle operator-directed signals 22, supplied as input to module 16, include a accelerator pedal position signal TP 24, a brake on/off switch signal 26, and a park neutral mode switch signal (P/N mode) 28. Engine speed signals (RPM) are produced by an engine speed sensor 30. Signals representing current engine mass air flow MAF 32 are supplied as input to module 20, and an engine coolant temperature signal ECT 34 is supplied to the ECU 16. The engine itself is indicated at 35.

Transmission actuators 36, which receive output produced by the microcomputer 16 upon executing the control strategies, include a pulse-width modulated solenoid PWM, a variable-force solenoid VFS VFS1-6 and SS1. The PWM and VSF output signals are communicated to control valve body 38 of the transmission 10. The shift signals are distributed to a shift valve portion 40 of the transmission control valve body 38. An engine-driven pump in the valve body 38 develops a regulated line pressure in line pressure passage 42, which is distributed to the transmission actuators. Output signals from the transmission are fed back to the computer 16, as shown at 44.

The transmission sensor outputs include, but are not limited to a turbine speed sensor signal TSS, manual lever position signal MLP, transmission operating temperature signal TOT, and output shaft speed signal OSS. Vehicle speed is easily computed from the OSS signal. The driver selects the manual lever position, as indicated at 46.

Figures 2, 5:
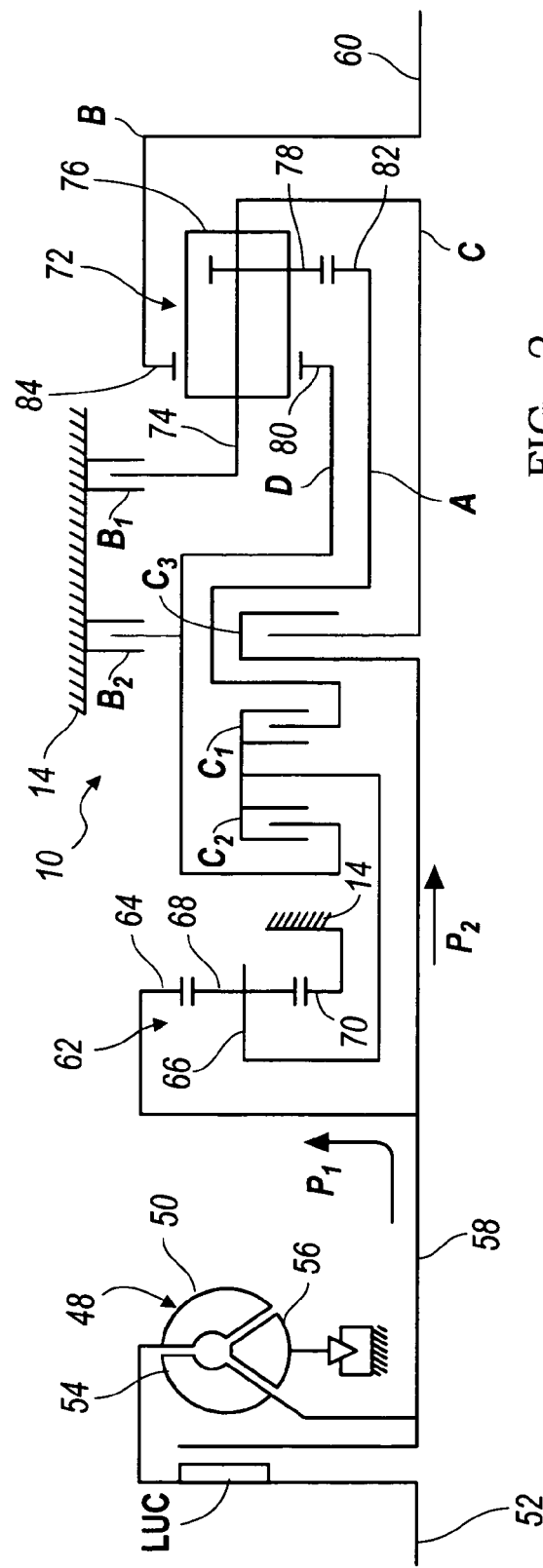
FIG. 2 is schematic diagram showing the kinematic arrangement of a transmission of the type to which the control of this invention may be applied.
FIG. 5 shows a lookup table containing commanded engine speeds referenced to the synchronous turbine speed of the target gear and the time rate of change of vehicle speed.

An example of a transmission to which the control method and system of this invention may be applied is shown in FIG. 2. However, the invention is not limited to a transmission having any particular kinematic arrangement. For example, the control method and system may be applied also to a transmission in which none of the gear units are Simpson gearsets, but any or all of the gear units may include simple, compound or Ravigneaux planetary gear units.

In FIG. 2, the torque converter 48, which is enclosed in the torque converter housing 12 shown in FIG. 1, includes an impeller 50, a bladed wheel driveably connected to the engine crankshaft 50; a turbine 54, a bladed wheel hydrokinetically coupled to the impeller; and a stator 56, a bladed wheel interposed in a toroidal flow path between the impeller and turbine. The input 58 and output 60 are axially aligned.

A simple planetary gearset 62 includes a ring gear 64, secured to the input shaft 58; a planet carrier 66, connected to a first control clutch C1 and to the second control clutch C2; planet pinions 68; and a sun gear 70, fixed to the housing 14.

The input shaft 58 directly drives a third control clutch C3. Control brakes B1 and B2 alternately hold sun gear 80 and carrier 74, respectively, against rotation and release them to rotate freely.

A Ravigneaux planetary gearset 72 includes a planet carrier 74, which supports and carries planet pinions 76 meshing with a second set of planet pinions 78, sun gear 80, and ring gear 84. An additional sun gear 82 meshes with planet pinions 78.

In first gear, the first control clutch C1 and the first control brake B1 are engaged. Sun gear 82 is driven according to speed ratio produced by gear unit 62, and carrier 74 C is held against rotation. The output 60 is driven at the speed of ring gear 84 according to speed ratio produced by gear unit 62 and the low reduction ratio of the double planetary gearset 72.

In second gear, the first control clutch C1 and the second control brake B2 are engaged. Sun gear 80 is driven according to speed ratio produced by gear unit 62, and sun gear 80 is held against rotation. Output 60 and ring gear 84 are driven according to speed ratio produced by gear unit 62 and the intermediate reduction ratio of the Ravigneaux planetary gearset 72.

In third gear, the first and second control clutches C1 and C2 are engaged. Sun gears 80, 82 and the double planetary gearset 72 are underdriven as a unit by gear unit 62 at the speed of the carrier 66.

In fourth gear, the first and third control clutches C1 and C3 are engaged. Sun gear 82 is underdriven at the speed ratio produced by gear unit 62, and carrier 74 is driven at the speed of input 58 through clutch C3. The speed of output 60 and ring gear 84 is lower than the speed of input 58.

In fifth gear, the second and third control clutches C2 and C3 are engaged. Sun gear 80 is underdriven at the speed ratio produced by gear unit 62, and carrier 74 is driven at the speed of input 58 through clutch C3. The speed of output 60 and ring gear 84 is greater than the speed of input 58.

In sixth gear, the third control clutch C3 and the second control brake B2 are engaged. The carrier 74 is driven at the speed of input 58 through clutch C3, but sun gear 80 is held against rotation. The speed of ring gear 84 and output 60 is greater than in fifth gear due to the entire overdrive ratio produced by the Ravigneaux planetary gearset 72.

In reverse drive, the second control clutch C2 and the first control brake B1 are engaged. The sun gear 80 is underdriven by gear unit 62, and carrier 74 is held against rotation. Output 60 is underdriven in a reverse direction by the reverse drive ratio of the Ravigneaux planetary gearset 72.

The control strategy of the present invention can be applied during any power-off or coasting downshift of the transmission because each downshift is a synchronous shift involving the release or disengagement of an off-going hydraulically actuated friction element, either a clutch C1, C2, C3 or a brake B1, B2, and the application or engagement of an oncoming friction element. Optimal coasting downshifts occur when the turbine speed is less than the engine speed.

Figure 3:
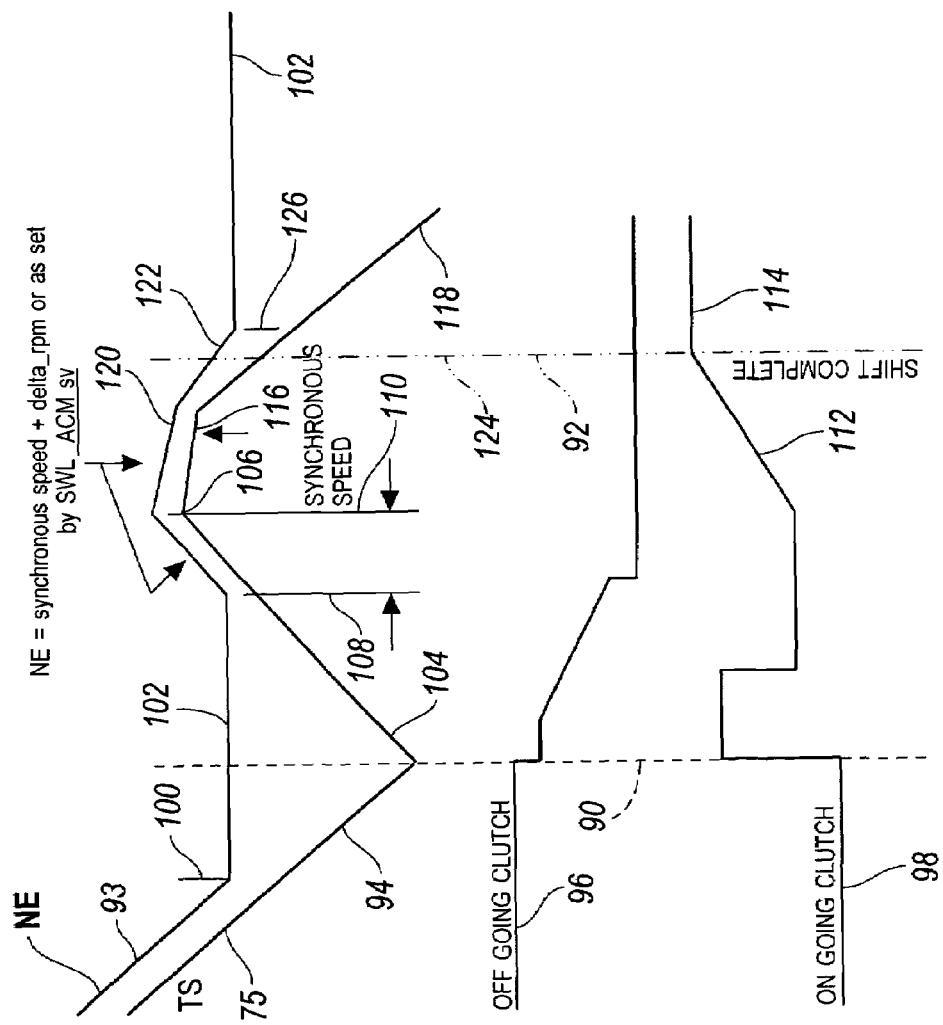
FIG. 3 is a graph showing the relation in magnitude turbine speed, engine speed and pressure in the friction element before, during and after a coasting downshift controlled according to the present invention.

Referring to the graph of FIG. 3, a coasting downshift from the current gear, such as second gear, to the next lower gear of the transmission begins at 90 and ends at 92. Before the gear change begins, engine speed NE and vehicle speed or turbine speed TS are decreasing due to the vehicle operator having backed away from the engine accelerator pedal allowing the engine throttle to close, engine speed to slow, and turbine speed TS to decrease gradually, perhaps linearly, along ramps 93, 94, respectively. During this time, pressure in the off-going control element 96 (brake B2 for a 2-1 downshift of the transmission of FIG. 2) and the oncoming control element 98 (brake B1) is maintained constant. The decrease in engine speed 93 is discontinued at 100 where engine speed is maintained for a period at a base or reference idle speed 102.

When the downshift starts at 90, engine speed is maintained constant at 102, pressure in the off-going element 96 drops and continues to decline, pressure in the oncoming element 98 increases in a step, and turbine speed TS enters an up ramp 104 due the increase in transmission speed ratio that occurs as torque transfers to the oncoming element 98 from the off-going element 96.

As turbine speed TS increases further on ramp 104 toward a target turbine speed 106, the downshift control begins at 108 to increase engine speed such that turbine speed does not exceed engine speed. As discussed below, depending on the particular downshift being performed, engine speed is commanded and controlled equal to (1) the synchronous turbine speed of the target gear, (2) a predetermined speed differential above turbine speed, (3) a predetermine speed greater than turbine speed that is stored in computer memory, (4) a speed that is stored in computer-accessible lookup memory as a function of the synchronous turbine speed of the target gear lookup value, or (5) a desired speed that is stored in computer-accessible lookup memory as a function of the synchronous turbine speed of the target gear and the time rate of change of the speed of the output shaft.

The synchronous turbine speed for the target gear is the speed the turbine will have at the current vehicle speed and with the transmission operating in the target gear upon completing the downshift.

When turbine speed reaches its target speed 106 at 110, pressure in the off-going control element 96 will have decreased sufficiently such that its torque capacity is substantially zero, and pressure in the oncoming control element 98 begins to increase along ramp 112 toward its maximum 114, whereupon the oncoming element 98 is fully engaged. After reaching its target speed 106, turbine speed TS decreases briefly on ramp 116 and at a faster rate on ramp 118. Engine speed decreases on ramps 120 and 122 subject to control of the ECU 20 and in response to engine speed command signals produced by the TCU 16 and received by the ECU. At 124, the downshift to the target gear is completed, but engine speed continues to decrease until it again reaches the base idle speed 102 at 126.

Figure 4:
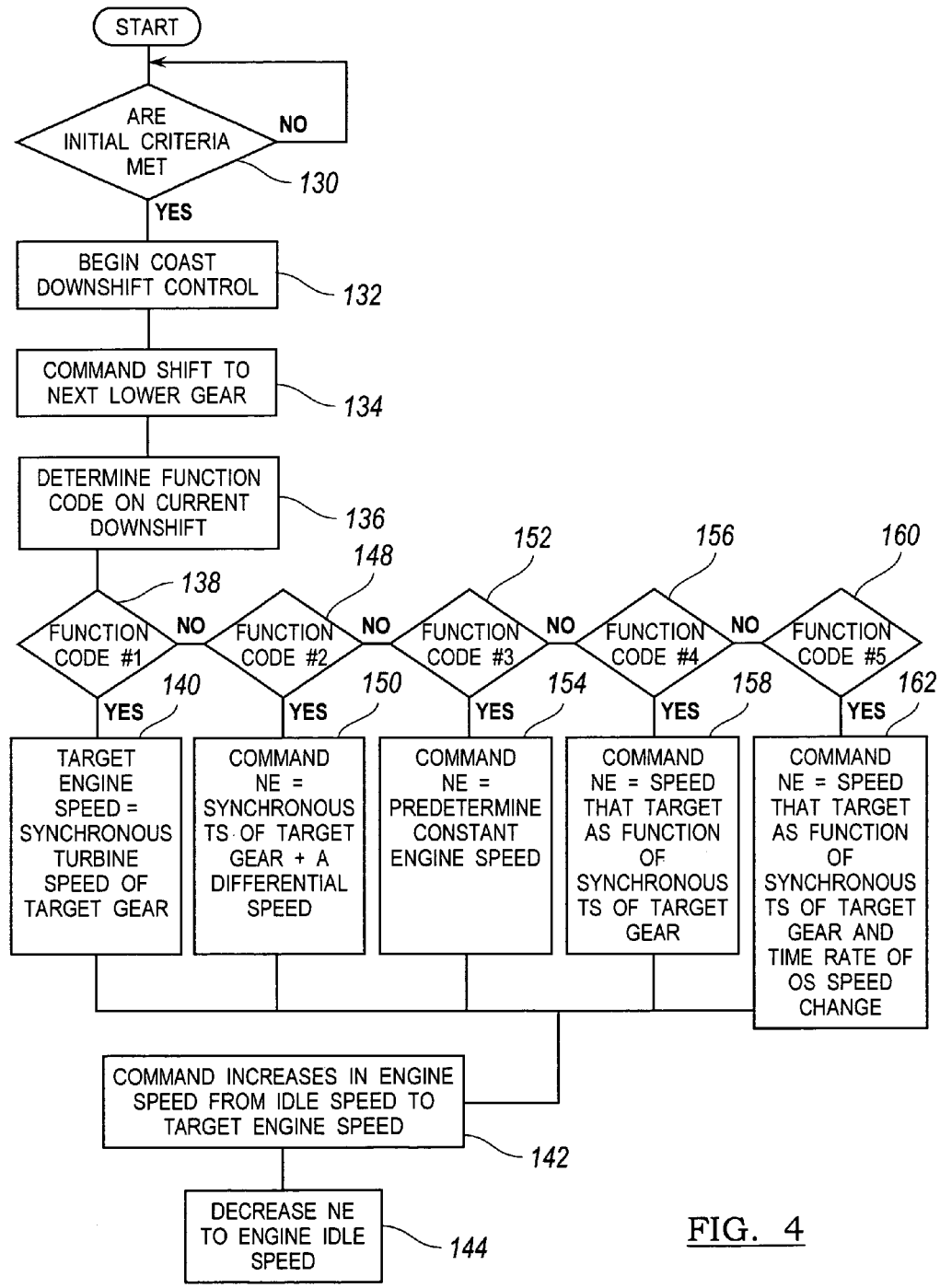
FIG. 4 is a flow diagram of the coasting downshift control.

Referring to the logic diagram of FIG. 4, a check is made at 130 to determine whether the following initial criteria are met:

transmission temperature TOT is higher than a predetermined threshold;
the transmission is not performing a gear ratio change;
the current gear is a higher gear than the lowest gear; and
output shaft speed OSS is less than a maximum permissible output shaft speed, whose magnitude may be stored in memory accessible to the computer.

If the test at 130 is positive, the coast downshift control is entered at 132 and a downshift to the next lower gear is commanded at 134, which corresponds to the beginning of the shift event 90 illustrated in FIG. 3.

For every downshift, the coast downshift control assigns a function code in the range 1-5. Function codes are assigned by calibration for the situation best suited for the shift event, according to the experience and judgment of a calibrator who assigns the code to the shift event. The coasting downshift control determines at 136 the function code for the commanded downshift and then commands the following actions depending on the function code assigned to the prospective shift event.

If the test at 138 indicates that the current function code is 1, at 140 the coast downshift control sets a target engine speed equal to the engine speed that corresponds to the synchronous turbine speed 106 for the target gear. To avoid large jumps in the commanded engine speed, at 142 the coast downshift control produces signals sent to the ECU 20 representing intermediate magnitudes of commanded desired engine speed, which gradually increase engine speed greater than idle speed 102 along the ramp function 104 to the target desired engine speed. The control sets the commanded desired engine speed to zero if it is outside certain limits. After the target engine speed is reached, at 144 the control gradually decreases the desired engine speed along ramps 120, 122 to the engine idle speed 102, and the control strategy terminates at 146.

If the test at 148 indicates that the current function code is 2, at 150 the coast downshift control sets a target engine speed equal to the synchronous turbine speed of the target gear plus a speed differential or offset, and at 142 the control produces signals sent to the ECU 20 representing intermediate magnitudes of commanded desired engine speed, which gradually increase engine speed greater than idle speed 102 along the ramp function 104 to the target desired engine speed. At 144, after the target engine speed is reached, the control gradually decreases the desired engine speed along ramps 120, 122 to the engine idle speed 102.

If the test at 152 indicates that the current function code is 3, at 154 the coast downshift control sets a target engine speed equal to a constant engine speed stored in computer memory, and at 142 the control produces signals sent to the ECU 20 representing intermediate magnitudes of commanded desired engine speed, which gradually increase engine speed greater than idle speed 102 along the ramp function 104 to the target desired engine speed. After the target engine speed is reached, at 144 the control gradually decreases the desired engine speed along ramps 120, 122 to the engine idle speed 102, and the control strategy terminates at 146.

If the test at 156 indicates that the current function code is 4, at 158 the coast downshift control sets a target engine speed equal to an engine speed stored in a lookup table as a function of synchronous turbine speed of the target gear. At 142 the downshift control produces signals sent to the ECU 20 representing intermediate magnitudes of commanded desired engine speed, which gradually increase engine speed greater than idle speed 102 along the ramp function 104 to the target desired engine speed. After the target engine speed is reached, at 144 the control gradually decreases the desired engine speed along ramps 120, 122 to the engine idle speed 102, and the control strategy terminates.

If the test at 160 indicates that the current function code is 5, at 162 the coast downshift control sets a target engine speed equal to an engine speed stored in a lookup table 164 as a function of synchronous turbine speed of the target gear and the time rate of change of output shaft speed. FIG. 5 illustrates representative commanded engine speed magnitudes from lookup table 164. At 142, the downshift control produces signals sent to the ECU 20 representing intermediate magnitudes of commanded desired engine speed, which gradually increase engine speed greater than idle speed 102 along the ramp function 104 to the target desired engine speed. After the target engine speed is reached, at 144 the control gradually decreases the desired engine speed along ramps 120, 122 to the engine idle speed 102, and the control strategy terminates at 146.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In an automatic transmission for producing multiple gear ratios between an input and output and having a torque converter that includes an impeller driveably connected to an engine, and a turbine hydrokinetically coupling the impeller to the input, a method for controlling a coasting downshift to a target gear during a coast condition comprising the steps of:
   (a) determining a target engine speed for the downshift, the target engine speed being a synchronous turbine speed for the target gear at the current vehicle speed;
   (b) allowing the engine speed to decrease to an idle speed while coasting;
   (c) disengaging an off-going control element and engaging an oncoming control element while executing the downshift;
   (d) allowing the turbine speed to increase during the downshift;
   (e) increasing the engine speed to the target engine speed during the downshift;
   (f) decreasing the engine speed to the idle speed; and
   (g) completing the downshift to the target gear.

2. The method of claim 1 wherein the target engine speed is equal to the synchronous turbine speed for the target gear at the current vehicle speed plus a constant.

3. The method of claim 1 wherein the target engine speed varies as a function of a synchronous turbine speed for the target gear during the downshift.

4. The method of claim 1 wherein the target engine speed varies as a function of a synchronous turbine speed for the target gear and a time rate of change of the speed of the output during the downshift.

5. The method of claim 1 wherein step (c) further comprises changing the torque capacity of the oncoming and off-going control elements by varying the magnitude of pressure in the oncoming and off-going control elements during the downshift.

6. The method of claim 1 wherein step (e) further comprises maintaining the engine speed greater than the turbine speed during the downshift.

7. The method of claim 1 wherein step (e) further comprises:
   steadily increasing the engine speed to the target engine speed; and
   maintaining the engine speed equal to or greater than the turbine speed during the downshift.

8. A system for controlling a coasting downshift to a target gear during a vehicle coast condition comprising:
   an engine;
   an automatic transmission including an input, an output, gearing for producing multiple gear ratios between the input and output, a torque converter including an impeller driveably connected to the engine, and a turbine hydrokinetically coupling the impeller to the input;
   an engine control unit for controlling operation of the engine including allowing the engine speed to decrease to an idle speed during the coast condition, increasing the engine speed to the target engine speed during the downshift and decreasing the engine speed to the idle speed in response to commands; and
   a transmission control unit communicating with the engine control unit, for controlling operation of the transmission, determining a target engine speed for the downshift, the target engine speed being a synchronous turbine speed for the target gear at the current vehicle speed, disengaging an off-going control element and engaging an oncoming control element while executing the downshift, and commanding the engine control unit to increase the engine speed to the target engine speed during the downshift and to decrease the engine speed to idle speed after the engine speed reaches the target engine speed.

* * * * *